(12) United States Patent
Pilla et al.

(10) Patent No.: US 10,146,068 B2
(45) Date of Patent: Dec. 4, 2018

(54) LENS AND METHOD FOR ENHANCED VISUAL TARGETING OF A SPORTS ARCHERY TARGET

(71) Applicant: Carl Zeiss Vision Italia S.p.A., Castiglione Olona (VA) (IT)

(72) Inventors: Philip Pilla, Ridgefield, CT (US); Carlo Pilla, Ridgefield, CT (US); Sabrina Malnati, Lozza (VA) (IT); Massimiliano Disconzi, Lonate Ceppino (IT)

(73) Assignee: Carl Zeiss Vision Italia S.p.A., Castiglione Olona (VA) (IT)

( * ) Notice: Subject to any disclaimer, the term of this patent is extended or adjusted under 35 U.S.C. 154(b) by 100 days.

(21) Appl. No.: 15/225,455

(22) Filed: Aug. 1, 2016

(65) Prior Publication Data

US 2016/0341979 A1 Nov. 24, 2016

Related U.S. Application Data

(63) Continuation of application No. PCT/US2014/014158, filed on Jan. 31, 2014.

(51) Int. Cl.
*G02C 7/10* (2006.01)
*F41J 3/00* (2006.01)
*G02B 5/22* (2006.01)

(52) U.S. Cl.
CPC ............ *G02C 7/104* (2013.01); *F41J 3/0004* (2013.01); *G02B 5/223* (2013.01)

(58) Field of Classification Search
CPC ............. G02C 7/10; G02C 7/104; G02C 7/02

USPC .............. 351/159.29, 159.49, 159.59, 159.6, 351/159.63; 359/722
See application file for complete search history.

(56) References Cited

U.S. PATENT DOCUMENTS

| | | | |
|---|---|---|---|
| 5,149,183 A * | 9/1992 | Perrott | ..................... G02B 5/22 351/159.63 |
| 5,592,245 A | 1/1997 | Moore et al. | |
| 6,382,788 B1 | 5/2002 | Stehager | |
| 6,536,905 B2 | 3/2003 | Gibb et al. | |

(Continued)

OTHER PUBLICATIONS

European search report of the European patent office dated Apr. 13, 2017 in parallel European patent application EP 14881301.7.

(Continued)

*Primary Examiner* — Darryl J Collins
(74) *Attorney, Agent, or Firm* — Walter Ottesen, P.A.

(57) ABSTRACT

A lens for eyewear, the lens having a transmittance in a spectral range at least between 400 and 780 nm. The spectral range includes a first and a second color range which are different from each other. The first and second color ranges are each at least 50 nm broad. A first medium transmittance in the first range is higher than a second medium transmittance in the second range. A medium transmittance in the spectral range is above 35%. A maximum transmittance value in the spectral range is above 70%. The second medium transmittance is below 20%. A maximum value of transmittance within the second range is below 30%. The first medium transmittance is at least 15% higher than the second medium transmittance. Further, a method for providing a lens for eyewear for sports archery is provided. In particular, this may enhance visually targeting a sports archery target.

19 Claims, 8 Drawing Sheets

(56) References Cited

U.S. PATENT DOCUMENTS

| | | |
|---|---|---|
| 6,794,066 B2 | 9/2004 | Macchi et al. |
| 2002/0126256 A1 | 9/2002 | Larson |
| 2002/0135734 A1* | 9/2002 | Reichow ............... G02C 7/104 |
| | | 351/159.63 |
| 2004/0119940 A1 | 6/2004 | Kerns, Jr. et al. |
| 2006/0033851 A1 | 2/2006 | Iori et al. |
| 2006/0114573 A1 | 6/2006 | Iori et al. |
| 2013/0141693 A1 | 6/2013 | McCabe et al. |

OTHER PUBLICATIONS

Rosco, "Roscolux" Rosco.com, archive Oct. 31, 2013, downloaded from the internet May 12, 2014 URL=<http://web.archive.org/web/20131031232432/http://www.rosco.com/filters/roscolux.cfm>.

DIN EN ISO 13666: Nov. 1998 of the DIN Deutschen Institut fuer Normung, e.V., pp. 1 to 51.

International Search Report and Written Opinion of the international searching authority dated May 21, 2014 in international patent application PCT/US14/14158 on which the claim of priority is based.

Jendrusch, G. et al, "Colored filters and polarizing filters for use in winter sports", Current Contactology, Aktkontaktol, Apr./May 2012, 7th year, Issue 19, pp. 24 to 28.

DIN EN ISO 1836:2007-11, Personal eye-equipment-Sunglasses and sunglare filters for general use and filters for direct observation of the sun (includes Amendment A1:2007), English version, DIN Deutschen Institut fuer Normung, e. V., Berlin, Germany, Nov. 2007, pp. 1 to 43.

International Standard ISO 12311, "Personal protective equipment—Test methods for sunglasses and related eyewear", ISO 12311:2013(E), copyright ISO 2013. pp. 1 to 86.

International Standard ISO 12312-1, "Eye and face protection—Sunglasses and related eyewear—Part 1: Sunglasses for general use", ISO 12312-1:2013(E), copyright ISO 2013. pages 1 to 24.

* cited by examiner

| 280 | 0.0 | 290 | 0.0 | 300 | 0.0 |
| --- | --- | --- | --- | --- | --- |
| 310 | 0.0 | 320 | 0.0 | 330 | 0.0 |
| 340 | 0.0 | 350 | 0.0 | 360 | 0.0 |
| 370 | 0.0 | 380 | 0.0 | 390 | 0.0 |
| 400 | 0.1 | 410 | 14.2 | 420 | 49.1 |
| 430 | 63.8 | 440 | 70.4 | 450 | 71.5 |
| 460 | 74.0 | 470 | 78.6 | 480 | 78.3 |
| 490 | 78.3 | 500 | 74.7 | 510 | 72.8 |
| 520 | 67.0 | 530 | 61.0 | 540 | 55.0 |
| 550 | 45.1 | 560 | 32.8 | 570 | 24.7 |
| 580 | 17.0 | 590 | 11.7 | 600 | 4.1 |
| 610 | 1.1 | 620 | 1.6 | 630 | 1.9 |
| 640 | 1.2 | 650 | 0.9 | 660 | 0.2 |
| 670 | 0.0 | 680 | 0.0 | 690 | 0.1 |
| 700 | 5.1 | 710 | 15.3 | 720 | 20.8 |
| 730 | 22.1 | 740 | 22.8 | 750 | 25.4 |
| 760 | 31.6 | 770 | 41.7 | 780 | 54.7 |

Fig.6

| % TRANSMISSION VALUES ( CENTER ) | | | | | |
|---|---|---|---|---|---|
| 280 | 0,0 | 290 | 0,0 | 300 | 0,0 |
| 310 | 0,0 | 320 | 0,0 | 330 | 0,0 |
| 340 | 0,0 | 350 | 0,0 | 360 | 0,0 |
| 370 | 0,0 | 380 | 0,0 | 390 | 0,0 |
| 400 | 0,3 | 410 | 20,9 | 420 | 62,4 |
| 430 | 77,7 | 440 | 83,1 | 450 | 84,4 |
| 460 | 84,7 | 470 | 85,1 | 480 | 85,0 |
| 490 | 84,8 | 500 | 84,3 | 510 | 83,4 |
| 520 | 81,9 | 530 | 80,0 | 540 | 77,3 |
| 550 | 72,6 | 560 | 64,2 | 570 | 58,7 |
| 580 | 52,2 | 590 | 45,4 | 600 | 27,7 |
| 610 | 15,0 | 620 | 20,5 | 630 | 23,5 |
| 640 | 17,8 | 650 | 15,2 | 660 | 6,4 |
| 670 | 0,1 | 680 | 0,0 | 690 | 3,8 |
| 700 | 32,0 | 710 | 55,6 | 720 | 65,4 |
| 730 | 69,3 | 740 | 71,0 | 750 | 72,9 |
| 760 | 75,7 | 770 | 79,1 | 780 | 82,6 |

LENS AND METHOD FOR ENHANCED VISUAL TARGETING OF A SPORTS ARCHERY TARGET

CROSS-REFERENCE TO RELATED APPLICATION

This is a Continuation application of International patent application PCT/US2014/014158, filed Jan. 31, 2014, the entire content of which is incorporated herein by reference.

BACKGROUND OF THE INVENTION

The current invention is directed to a lens for an eyewear, the lens having a transmittance in a spectral range at least between 400 and 780 nm, in particular between 400 and 780 nm or between 380 and 780 nm, wherein the spectral range includes a first color range and a second color range which are different from each other, wherein the first color range is at least 50 nm broad, wherein the second color range is at least 50 nm broad, wherein a first medium transmittance in the first color range is higher than a second medium transmittance in the second color range.

According to a further aspect of the current invention, a method for providing a lens for an eyewear for sports archery is also provided. According to yet a further aspect, a use of a lens is provided. According to even further aspects, a method of using a lens and a method for enhancing or supporting visual targeting of a sports archery target are provided.

In shooting sports, in particular in sports archery or Olympic archery, commonly known standard targets are used to shoot at. In general, in particular in sports archery, the target includes a center field or bulls-eye that is encompassed by a multitude of rings. Each ring designates a field on the target to which a certain number of points is assigned. Of course, the center field provides for the most points. Hence, an athlete aims at the center of the provided target. To make the target better recognizable and to indicate its center, in sports archery, the target is colored. Usually two adjacent rings are colored with the same color. The center field and the first encompassing ring are in yellow, then red, then blue, then black and then white in an outwards direction.

Therefore, during an exhibition or a competition, the athlete aims at the yellow center field. Competitions usually last about several hours. In most disciplines, the athletes have to shoot dozens of arrows onto targets in different distances. Hence, sports archery requires a lot of concentration and endurance as well as physical fitness to keep the shooting routine on a perfect level over the course of a full competition.

As the targets are usually spaced in large distances of, for example, 15, 30, 60 or even 90 meters, good vision is required to properly aim at a target. However, during long exhibitions and competitions, the eye of the athlete might become exhausted focusing on the yellow center field. Colors may become blurred, the eyes may become subject to tearing up and visually aiming might be considered exhausting by the athlete. This may all reduce concentration and the shooting routine and, hence, has a negative effect on the overall shooting performance.

In the prior art, eyewear for supporting vision during certain recreational activities or recreational applications has been provided. For example, document U.S. Pat. No. 6,382,788 B1 provides for an eyeglass with modified light transmission that may be of particular use in an environment dominated by green colored vegetation. Hence, such an eyeglass may be of use for hunters or golfers.

Further, document US 2002/0126256 A1 shows a polarized lens with oxide additive. Such glasses may be of use when watching reflective surfaces. Hence, such glasses may be of use during fishing or skiing.

However, there remains a need for enhancing or supporting vision of an athlete who aims at a target, in particular in sports archery, and in particular for an athlete aiming at a colored target.

BRIEF SUMMARY OF THE INVENTION

Hence, according to a first aspect, the lens as initially described has a medium transmittance in the spectral range above 35%, wherein a maximum value of transmittance in the spectral range is above 70%, wherein the second medium transmittance in the second color range is below 20%, wherein a maximum value of transmittance within the second color range is below 30%, and wherein the first medium transmittance is at least 15% higher than the second medium transmittance.

In general, the term "lens" shall mean the finished lens for an eyewear, i.e. a substrate, in particular made of glass or plastic, having its coating, if any, already applied thereon. The coating may include a hard coat, a single layer or multilayer antireflective coating and a top coat for easy cleaning.

The term "transmittance" is a commonly known term in physics. It measures the fraction of the intensity of incoming light which is transmitted through the lens. In particular, the usage shall refer to a light ray impinging perpendicularly onto a surface of the lens. Common tests to verify for the transmittance of a lens, in particular according to the invention, may be used as described in the European norm "Personal eye-equipment—Sunglasses and sunglare filters for general use and filters for direct observation of the sun", EN 1836:2005+A1:2007, and/or as described in the norms ISO 12312-1 "Eye and face protection—Sunglasses and related eyewear-Part 1: Sunglasses for general use" and ISO 12311 "Personal protective equipment—Test methods for sunglasses and related eyewear". Portions of incoming light may further be absorbed or reflected. The transmittance shall be in the "spectral range" at least between 400 and 780 nm. In particular in case of non-prescriptive eyewear, the spectral range may be between 400 and 780 nm. In particular in case of prescriptive eyewear, the spectral range may be between 380 and 780 nm. This spectral range is also commonly defined as the human visible spectral range.

Within that spectral range, there shall be "a first color range" and "a second color range". These color ranges shall not mean that they have to exactly encompass a single color only. These terms are to be understood to define a certain wavelength range within the spectral range. Each of the first color range and the second color range shall be at least 50 nm broad. Hence, the term "broad" is understood to mean the wavelength bandwidth of the first color range or second color range.

The terms "medium transmittance", "first medium transmittance" and "second medium transmittance" define the average transmittance values within the respective wavelength range. It is mathematically calculated as commonly known according to following equation (1)

$$\overline{T} = \frac{1}{n_2 - n_1} \cdot \int_{n_1}^{n_2} T(n)\, dn,$$

wherein T shall mean the medium transmittance, $n_1$ shall mean the lower wavelength which is a boundary for the respective wavelength range, $n_2$ shall mean the higher wavelength which is the upper boundary of the respective wavelength range, T is the transmittance depending on a wavelength n, and wherein n is the integrated parameter, namely the wavelength over which the transmittance is integrated from $n_1$ to $n_2$.

Therefore, the medium transmittance in the spectral range (or third medium transmittance) is the average transmittance between at least 400 and 780 nm. In particular in case of non-prescriptive eyewear, the spectral range may be between 400 and 780 nm. In particular in case of prescriptive eyewear, the spectral range may be between 380 and 780 nm. The same applies for the first medium transmittance being the average transmittance in the first color range and the second medium transmittance being the average transmittance in the second color range.

Concerning the lens, the transmittance shall be measured in the center of the lens. The center may for example be defined as the optical axis of the lens. However, for example in case there is no optical axis, the center can also be defined as the geometrical center or as the boxed center of the lens in the commonly known boxing system, cf. section 5.1, 5.4 and 5.5 of DIN EN ISO 13666. DIN EN ISO 13666 is incorporated herein in its entirety by reference.

By this, three important items for the eyewear concerning sports archery are realized. First, the eyewear generally provides for quite a high overall transmittance in the spectral range. Of course, the athlete should not be placed in a dark surrounding when wearing the eyewear. Despite certain color ranges being darkened or nearly extinct, other color ranges shall not be affected and be able to pass light with a very high transmittance through the lens. Hence, also a maximum value of transmittance in the spectral range is very high. Second, a specific color range, which shall correspond to color in the region directly encompassing the center part, has a very low transmittance. For example in sports archery, the red ring encompassing the yellow center has a low transmittance and, thus, is appearing grey or even black for the athlete. Further, the transmittance in that color region is not only low in average but there is no peak thus avoiding any monochromatic or near-monochromatic color peaks to appear. This avoids the red ring distracting and negatively affecting vision of the athlete. It helps to relax his or her eye. Third, the medium transmittance in the first color range is significantly higher than in the second color range. Hence, yellow light in the center part may pass with high transmittance through the lens. This supports the center part appearing as a relatively bright yellow spot within a dark surrounding. This helps to reduce distraction and blur as the red and yellow color ranges are directly adjacent in the spectral field. This affect grows the longer the athlete has to focus on the target.

In particular in the sport of archery there is currently no eyewear available specifically designed for this type of sport. Usually, in Olympic archery, the athlete shoots arrows at a three-color target comprised of blue, red and yellow; yellow being the center most color. Though the exploration of finding more technical solutions for visual aptitude in the sport of archery, a technical solution for better focusing the eye on the center of the target is provided. The concept focuses the human eye's visual acquisition on the target center instead of seeing the entire target field. In particular, this is accomplished by reducing the visual field around the yellow center of the target. The visual impact of red as a color is reduced thereby allowing the eye to focus just on the yellow center of the target. This creates a smaller visual field for the eye to focus on. The overall sight picture can be reduced from a three color field to a two color field, in particular by turning "red" into a gray to black spectrum. The reduction of red from the target allows the eye to see yellow in the center with no visual red noise. This reduction and manipulation of the colored target creates a visual advantage to the archer by focusing the center of the target. This allows the eye to see the center of the target for sighting the archer's arrows. This is a distinct advantage for the athlete by "forcing" the eye to register the center of the archery target without the "red" rings of the target becoming a visual distraction. The value of the color red on an archery target is reduced, allowing the eye to "see" the yellow center of the target without distraction and enhancing the focus of the athlete on the center.

The visual manipulation takes into account the way the human eye sees "red" as a primary color. The technical deployment of the solution must reduce red and allow the eye to register yellow. It is not necessary to completely eliminate red or the color of the center. The technical solution created for sports archery reduces the value of red printed on an archery target relative to the value of yellow. The manipulation of the target printing in unbalancing the two colors creates a visual aptitude that focuses the eye on the center of the target. The value of red reduction is not solely absolute. As long as the printed red part of the archery target is reduced relative to the value of printed yellow, a visual shift is created for the benefit of the eye to see the center of the target with more efficiency.

According to a second aspect a method for providing a lens for an eyewear for shooting sports, in particular for sports archery, is provided. The method includes the steps of determining a color of a center of a target as a first target color; determining a color of a region directly encompassing the center of the target as a second target color, wherein the second target color is different from the first target color; and providing a lens having a transmittance in a spectral range, wherein the spectral range includes a first color range and a second color range which are different from each other, wherein a first medium transmittance in the first color range is high, and wherein a second medium transmittance in the second color range is low, and wherein the first color range corresponds to the first target color, and wherein the second color range corresponds to the second target color.

According to a third aspect a use of a lens according to a first aspect or one of its refinements for enhancing or supporting visually targeting a sports archery target is provided.

According to a fourth aspect a method of using a lens according to a first aspect or one of its refinements for enhancing or supporting visually targeting a sports archery target is provided.

According to a fifth aspect a method for enhanced visual targeting of a sports archery target is provided. The method includes the steps of providing at least one lens according to a method according to the second aspect or one of its refinements, providing an eyewear including the at least one lens, and using the eyewear for targeting a sports archery target or aiming at a sports archery target.

According to a sixth aspect, there may further be provided an eyewear, in particular a non-prescriptive eyewear, having at least one lens according to the first aspect. The eyewear may include a single or two lenses according to the first aspect.

According to a refinement, the first medium transmittance is at least 20% higher than the second medium transmittance, preferably at least 25% higher than the second medium transmittance, more preferably at least 35% higher than the second medium transmittance, most preferably at least 45% higher than the second medium transmittance.

In general, enhancing relaxed focusing of the dead center of the target, in particular during long lasting exhibitions or competitions, does not so much depend on absolute values of transmittance. Of course, the medium transmittance in the second color range should be relatively low and the first medium transmittance in the first color range should be relatively high. However, what is also important is the difference in the medium transmittance between both color ranges. Generally, it can be contemplated that the higher the difference, the better the visual enhancement. However, in case of sports archery, it has to be kept in mind that the color ranges are red and yellow. These color ranges are directly adjacent in the spectral field. As in a lens for an eyewear it cannot be provided for a step in the transmittance-wavelength-curve, there are of course compromises to be made concerning the difference.

According to a further refinement, the first color range has a first boundary wavelength and the second color range has a second boundary wavelength, wherein the first boundary wavelength of the first color range and the second boundary wavelength of the first color range are identical.

Therefore, the invention can specifically be used in case the colors of the target fields are directly adjacent in the spectral range. Then, the color ranges shall be chosen to be directly adjacent to one another as well as to best provide for the difference in transmittance between the two color fields.

According to a further refinement, the second color range is at least 100 nm broad, preferably at least 150 nm broad.

In particular, such apply to the second color range being the red color range. Then, this could also extend from for example 600 to 700 nm or even 600 to 780 nm to encompass the full red color range.

According to a further refinement, the second medium transmittance is below 15%, preferably below 10%, more preferably below 5%, most preferably below 2%.

By this, the transmittance in the second color range can be reduced very significantly. How much the transmittance is reduced may depend on the surroundings in which the lens shall be used. For example and as will be described in further detail below, for outdoor shooting it may be preferred to have the transmittance even below 2%. However, for indoor shooting, where different ambient light sources are present, it may be preferred to have a higher transmittance in the second color range. Further, in that case, it might further be preferred to have a higher overall transmittance over the whole spectral range.

In a further refinement, the first medium transmittance is above 20%, preferably above 30%, more preferably above 50%, most preferably above 70%.

In general, the first medium transmittance shall be relatively high. However, depending on the first color range and the second color range being adjacent for not and the absolute second medium transmittance, a compromise may be made to have the first medium transmittance not necessarily being above 70% but also for example above 30% may be considered sufficient. For example, that may be the case for outdoor shooting and wherein the second medium transmittance is below 2%.

In a further refinement, the medium transmittance in the spectral range is above 45%, preferably above 50%, more preferably above 60%, most preferably above 70%.

As briefly outlined above, the medium transmittance in the spectral range shall generally be high as it is not intended to place the athlete in a dark surrounding. However, depending on the detailed application, for example for indoor shooting or outdoor shooting, the medium transmittance over the whole spectral range may vary. For indoor shooting, it may be higher, even above 70%. For outdoor shooting, it may be considered sufficient to be above 50%.

In a further refinement, the first color range has a first medium wavelength and the second color range has a second medium wavelength, wherein the second medium wavelength is larger than the first medium wavelength.

In general, the current invention may be used with targets having arbitrarily color fields. However, it may be of particular advantage in sports archery and in case the field encompassing the dead center is red. As red is the upper boundary color region in the spectral field, such may form the second color range. Then, lower color regions even different from yellow may be emphasized.

In a further refinement, the second color range has a lowest wavelength and the first color range has a highest wavelength, wherein the lowest wavelength of the second color range and the highest wavelength of the first color range are identical.

Hence, such an embodiment particularly applies to targets where the colors of the target are chosen such that they are adjacent in the spectral field and the color of a second color range is above the color of the first color range in the spectral field. This particularly applies to sports archery wherein the dead center is yellow and the field encompassing the dead center is red.

According to a further refinement, the first color range and the second color range are each selected from a group consisting of a violet color range from 380 to 430 nm, a blue color range from 430 to 490 nm, a green color range from 490 to 550 nm, a yellow color range from 550 to 600 nm, an orange color range from 600 to 650 nm and a red color range from 650 to at least 700 nm, in particular from 650 to 780 nm.

Color ranges in a spectral range are sometimes defined differently. Hence, the above definitions may apply. In particular, the color ranges for a specific color may also be defined a little bit broader to fully encompass a certain color. This may help to surely extinct, reduce or emphasize a certain color on the target.

According to a further refinement, the first color range is from 600 to 700 nm and/or the second color range is from 550 to 600 nm.

This may specifically apply to sport archery targets, wherein the dead center is yellow and the neighboring ring is red.

According to a further refinement, a substrate of the lens is made of plastic, in particular polycarbonate, a polycarbonate-based plastic, polyamide, CR 39 or any other suitable material, which is tinted in order to provide for the desired transmittance.

Tinting a lens by placing sufficient dies in the plastic is commonly known. For example, dies may be placed in the pellets during extrusion of the lens substrate.

In particular, the pellet mixture can be comprised of pellets of a polycarbonate based resin and a multitude of dyes to achieve the desired transmission curve. The polycarbonate based resin can be Lexan OQ 4820 which is commercially available from SABIC Innovative Plastics, One Plastics Ave., Pittsfield, Mass. 01201, U.S.A. A possible dye is Macrolex Yellow E2R sold by Lanxess AG, Cologne, Germany, or any other chinoline dyestuff. A further possible dye is Sandoplast Blue 2B sold by Clariant AG, Muttenz, Switzerland, or any other anthraquinone dyestuff, in particular with CAS number 71872-84-9. A further possible dyestuff is Paliogen Blue L6480 sold by BASF SE, Ludwigshafen am Rhein, Germany, or any other indanthrone pigment. A further possible dye stuff is Heliogen Blue K 6902 sold by BASF SE, Ludwigshafen am Rhein, Germany, or any other copper-phthalocyanine pigment, in particular with CAS number 147-14-8.

In particular, per 1 kg of Lexan OQ 4820, a possible pellet mixture additionally consists of 0.002 g of Macrolex Yellow E2R, 0.02 g of Sandoplast Blue 2B, 0.034 g of Paliogen L6480 and 0.09 g of Heliogen K6902. Therein, kg abbreviates kilogram and g abbreviates Gram. Further, a possible mixture consists of 99.985402 wt % of Lexan OQ 4820, 0.0001999708 wt % of Macrolex Yellow E2R, 0.001999708 wt % of Sandoplast Blue 2B, 0.003399635 wt % of Paliogen L6480 and 0.0089986862 wt % of Heliogen K6902. Therein, wt % designates the weight percentage.

After mixing, an extrusion process at 300° C. can be carried out, in particular with a mono screw can in order to improve the color uniformity. Subsequently, a dry process for 4 hours at 120° C. and an injection molding process in a lens or shield mold at 280 to 300° C. follows. The lens or shield may then be dipped in a hard coating resin followed by a polymerization process with thermal curing at 120 to 130° C., in particular at 129° C. It is possible to apply a mirror coating e.g. with a vacuum process, for example according to U.S. Pat. No. 6,794,066 B2.

In this way, the desired transmission in the lens can be achieved.

In a further refinement of the method for providing a lens, the lens has a transmittance in a spectral range at least between 400 and 780 nm, wherein the first color range is at least 50 nm broad, wherein the second color range is at least 50 nm broad, and wherein a medium transmittance in the spectral range is above 35%, wherein a maximum value of transmittance in the spectral range is above 70%, wherein the second medium transmittance in the second color range is below 20%, wherein a maximum value of transmittance within the second color range is below 30%, and wherein the first medium transmittance is at least 15% higher than the second medium transmittance.

Hence, the method for providing a lens may specifically be provided for the lens specified according to the first aspect.

It goes without saying that the features mentioned above and the features to follow cannot only be used in the combinations provided but also in different combinations or alone without departing from the scope of the current invention.

Other features and advantages of the invention will be apparent from the following detailed description. Unless otherwise defined, technical and scientific terms used have the same meaning as commonly understood by one of ordinary skill in the art to which this invention belongs.

BRIEF DESCRIPTION OF THE DRAWINGS

The invention will now be described with reference to the drawings wherein.

DETAILED DESCRIPTION OF THE INVENTION

Figure 1:
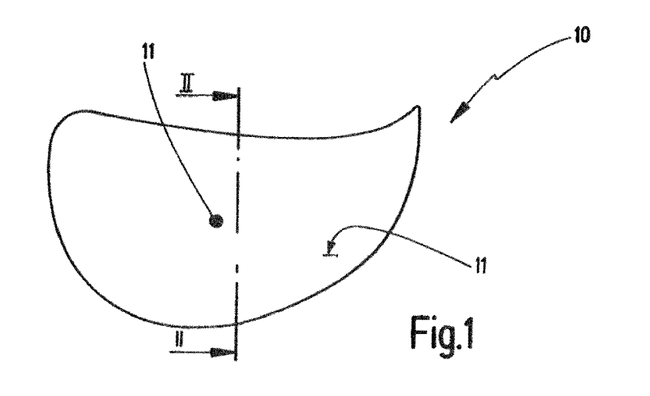
FIG. 1 shows an embodiment of a lens.
Figure 2:
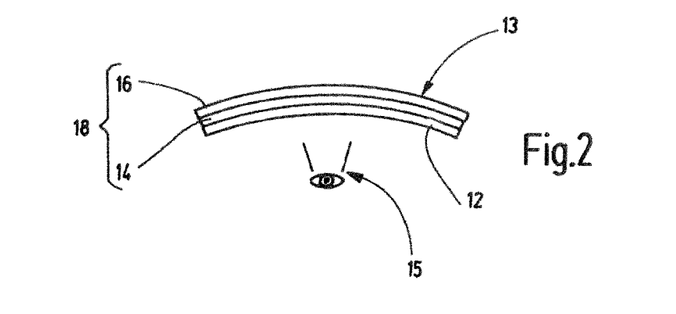
FIG. 2 shows a cross section along line II-II of the lens in FIG. 1.

FIG. 1 shows an embodiment of a lens 10. The lens may have any desired shape, in general. The lens may provide for a correction according to a prescription. However, this may not necessarily be the case. In particular, it may be preferred that the lens 10 is a non-prescriptive lens. The lens has a center 11. The center 11 may be on an optical axis of the lens 10. In particular, the center may be the intersection point of the optical axis and the front surface 13 of the lens. As shown in FIG. 2, the front surface 13 is the surface of the lens 10 facing away from the eye 15 of a wearer during use. However, in particular in case the lens 10 should not have an optical axis, the center 11 may be at its boxed center, i.e. the intersection of the horizontal and vertical center lines in the boxing system or box system, in particular in case of an edged lens. Alternatively, it could be the geometrical center in case of a lens blank or uncut lens. For the corresponding definitions, reference is made to sections 5.1, 5.4 and 5.5 of DIN EN ISO 13666.

FIG. 2 shows a cross section along line II-II in FIG. 1. In general, the lens 10 includes a lens substrate 12. However, the lens may further be coated on the front of the lens substrate 12 and/or on the back of the lens substrate 12. As an example, a first layer 14 and a second layer 16 are depicted on the front surface of the lens substrate 12. The coating may include a hard coating, a single layer or multilayer antireflective coating and a top coat for easy cleaning, for example a hydrophobic and/or oleophobic top coat. Hence, the terms "lens" and "lens body" include not only the lens substrate but also respective coatings. Therefore, the transmittance values apply to the finished lens/lens body, i.e. the lens substrate including the coating.

Figure 3:
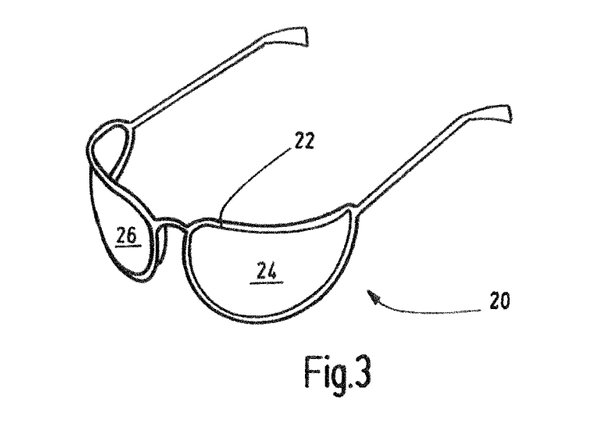
FIG. 3 shows an embodiment of an eyewear.

FIG. 3 shows an eyewear 20 having a frame 22 and a left lens 24 and a right lens 26. In particular, the eyewear 20 is non-prescriptive. Alternatively, it might also be the case that the eyewear 20 has only a single lens covering both eyes. At least one of the lenses 24 and 26 is a lens according to the current invention i.e. a lens 10. Generally, both lenses 24 and 26 can be configured according to the invention. However, for example in sports archery, it is usually the case that one eye of the athlete is shut or purposely covered so that only one eye is used for aiming at the target. For example, in case of a right-handed athlete pulling the string of the bow with his or her right hand, it may only be provided for the right lens 26 to be a lens 10 according to the current invention. The left lens 24 associated with the eye being shut or purposely covered may be a common lens. Of course, in case of a left-handed athlete, the same could apply vice versa.

Figure 4:
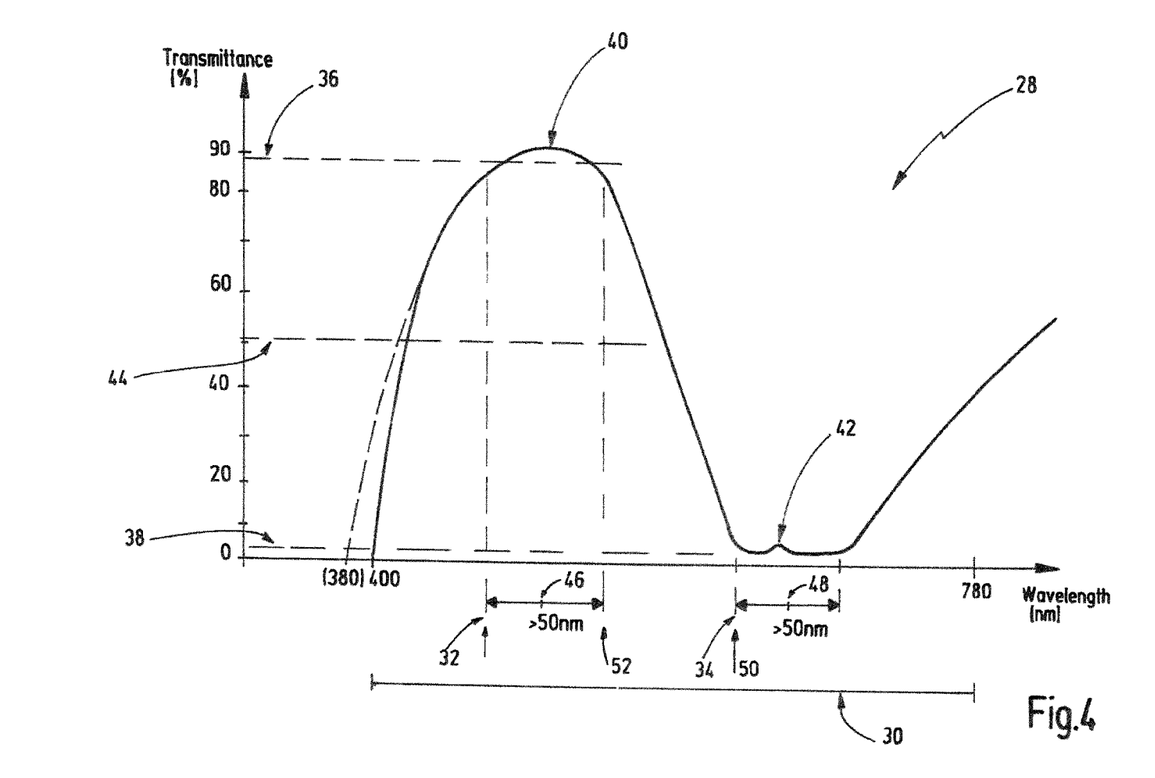
FIG. 4 shows a transmittance of a lens according to an embodiment.

FIG. 4 shows a wavelength dependent transmittance profile of an embodiment of the lens 10.

It is depicted as a general transmission graph 28. The lens has a transmittance in a spectral range 30 which is at least between 400 nm and 780 nm. In particular in case of non-prescriptive eyewear, the spectral range may be between 400 and 780 nm. In particular in case of prescriptive eyewear, the spectral range may be between 380 and 780 nm as indicated by the dashed line. This range is generally considered as the human visible spectral range. Within this spectral range 30, there is a first color range 32 and a second color range 34. Each of the first color range and the second color range is at least 50 nm broad, in particular at least 100 nm broad, more in particular at least 150 nm broad. Of course, it can also be the case that one of the first color range 32 and the second color range 34 is at least 100 nm broad or at least 150 nm broad while the respective other of the first color range and the second color range is at least 50 nm broad or at least 100 nm broad. The transmittance is cut off below 380 nm or 400 nm, respectively. From that point, the transmittance rises towards a peak, in particular which may be in the blue or green color range. From that peak, the transmittance drops again towards the second color range 34. Within the second color range, it remains low until it rises again towards 780 nm. The transmittance may remain high in the infrared region above 780 nm or may drop again.

Within the first color range there is a first medium transmittance 36 or average transmittance. Calculation of the medium transmittance according to the current invention is generally laid out in the initial part of the description. In common words, the transmittance is integrated over the respective color range and divided through its broadness. In other terms, it can be described by the following equation (1)

$$\overline{T} = \frac{1}{n_2 - n_1} \cdot \int_{n_1}^{n_2} \overline{T}(n)\,dn,$$

wherein $\overline{T}$ shall mean the medium transmittance, $n_1$ shall mean the lower wavelength which is a boundary for the respective wavelength range, $n_2$ shall mean the higher wavelength which is the upper boundary of the respective wavelength range, T is the transmittance of the lens dependent on wavelength n, and then n is the integrated parameter, namely the wavelength over which the transmittance is integrated from $n_1$ to $n_2$.

Further, the second color range 34 has a second medium transmittance 38. The first medium transmittance 36 is preferably above 20%, more preferably above 30%, even more preferably above 50% and most preferably above 70%. The second medium transmittance is below 20%, preferably below 15%, more preferably below 10%, even more preferable below 5% and most preferably below 2%.

There is a maximum value of transmittance 40 within spectral range 30. It is the highest value of transmission within the spectral range 30. Correspondingly, there is a maximum value of transmittance within the second color range 34 which is the maximum value or peak value of a transmittance within the second color range 34. The maximum value 40 is above 70%, preferably above 75%, more preferably above 80%, even more preferably above 85% and most preferably above 90%. The maximum value 42 within the second color range 34 is below 30%, preferably below 35%, more preferably below 20%, even more preferably below 50% and most preferably below 10%. By this, a relatively smooth profile of the graph 28 or transmittance curve within spectral range 30 can be provided.

Further, over the whole spectral range 30, there is a medium transmittance 44 which is above 35%, preferably above 40%, more preferably above 45%, even more preferably above 50% and most preferably above 55%. Further, it could also be above 60% or even above 70%.

The first color range has a medium wavelength 46. The second color range has a medium wavelength 48. In the embodiment depicted in FIG. 4, the medium wavelength 48 is higher than the first medium wavelength 46.

Further, the first color range 32 has a highest wavelength or upper boundary value 52. The second color range 34 has a lowest value or lower boundary value 50. In the embodiment depicted in FIG. 4, the wavelengths 50 and 52 are distinct from each other. However, they could also be identical. Then, the first color range 32 and the second color range 34 would be directly adjacent to one another.

Via the described transmittance profile, a relatively smooth transmittance profile with a high overall transmittance is provided. Further, the merely second color range is reduced for the wearer of the lens. However, a second color range is placed with a high transmittance and hence appears as if illuminated. So, preferably, the first color range shall correspond to a color of a center target region of a target. For example, in sports archery, that color is yellow and, hence, the first color range 32 may extend from 550 nm to 600 nm. Further, the second color range 34 shall correspond to the region directly encompassing the center of the target. For example, in an official FITA (World Archery Foundation) sports archery target, that color would be red. So, the second color range 34 may extend from 600 nm to 700 nm.

Figure 5:
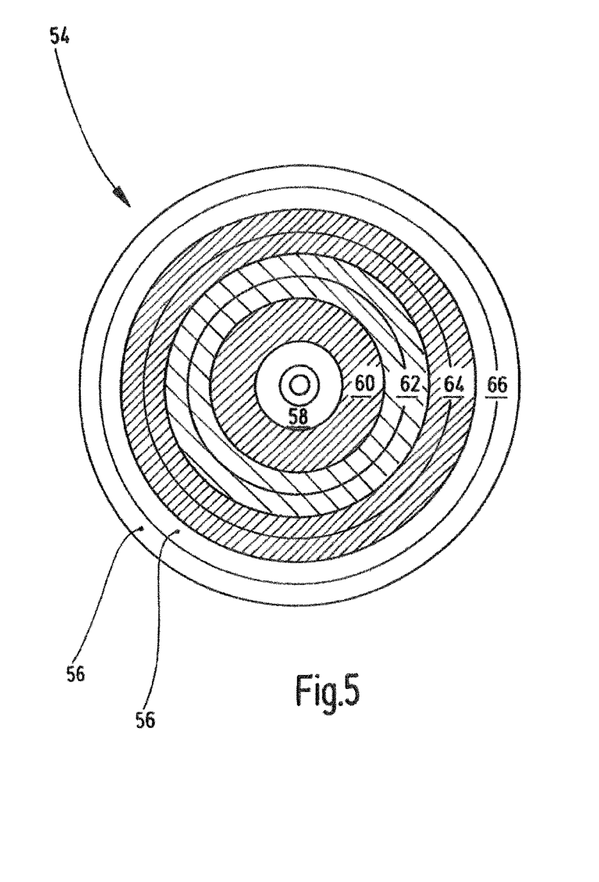
FIG. 5 shows a target.

An example for a target is shown in FIG. 5. FIG. 5 shows the example of an archery target 54. This target has a multitude of rings 56. These rings 56 count for points one to nine upwards towards the center of the target, wherein the center cycle counts for ten points. Hence, an athlete always aims for that center, namely the yellow region 58. It is directly encompassed by a red region 60. The red region 60 is directly encompassed by a blue region 62. The blue region is encompassed by a black region 64. And the black region 64 is encompassed by a white region 66. Hence, by wearing an eyewear including a lens 10, or two lenses 10, according to the current invention, the red region 60 can be nearly extinct and would only appear as dark gray or black as well. It makes it convenient and easy for an athlete to focus on the center region in yellow which appears clearly and without any blurring distractions in the center.

Figure 6:
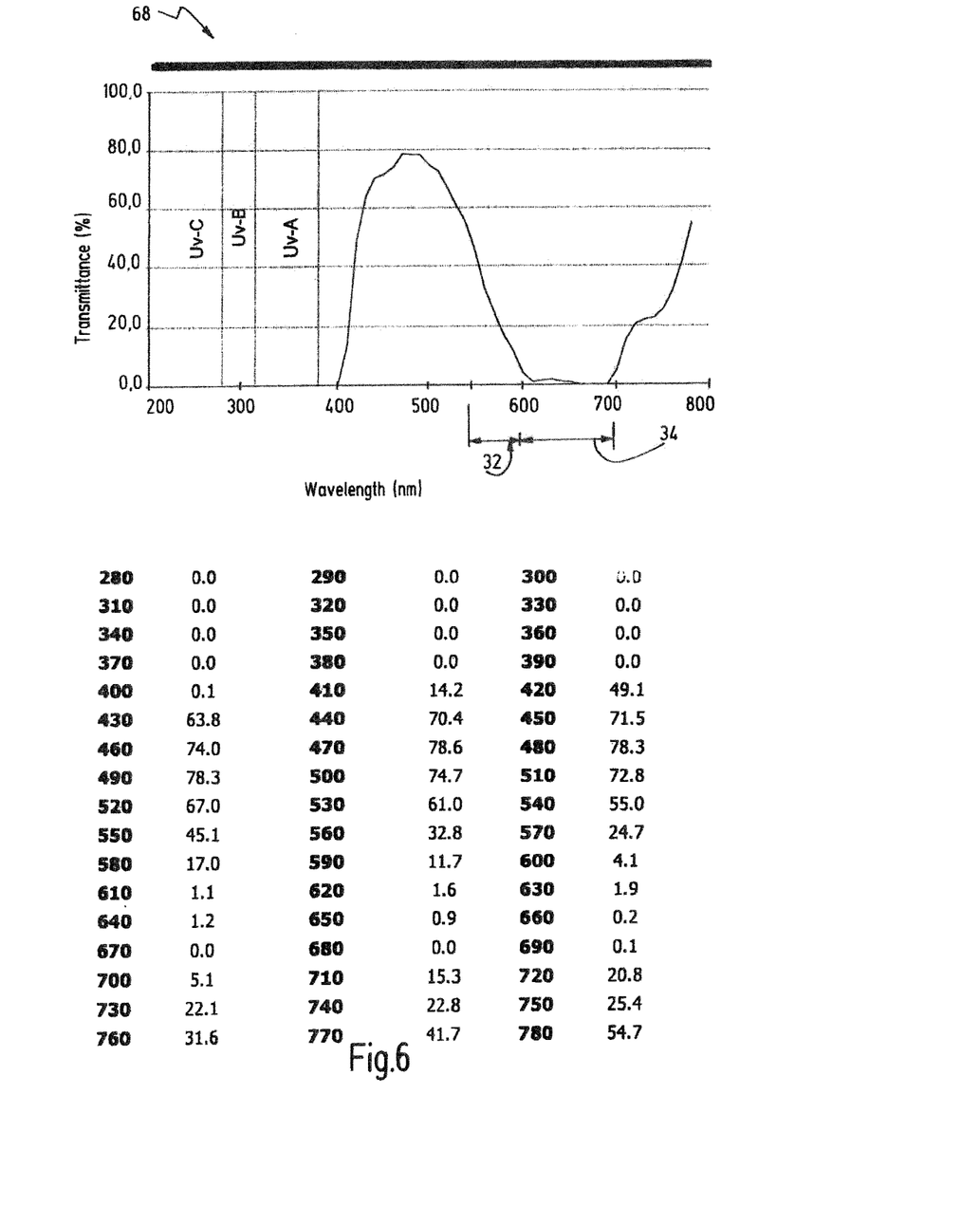
FIG. 6 shows a transmittance curve of an embodiment, in particular for outdoor archery.

FIG. 6 shows a further embodiment of a transmittance graph of a lens in particular to be applied for outdoor archery. The medium transmittance of the lens in the whole spectral range 30 is chosen quite low. This is as the sun as an ambient light source outdoors is generally quite bright during competitions and, hence, the eyes may need a certain amount of protection. Therefore, the second color range 34 is low, e.g. the second medium transmittance 38 is below 2%. In particular, the peak value in the second color range is well below 10% to avoid high peaks that may provide for bright monochromatic or nearly monochromatic distractions within the range. The second color range again covers the red wavelength. Directly adjacent and below the second color range 34 is the first color range 32 which covers yellow. The transmittance there is at least 20%. In general, the transmittance of above 20% would not be considered high. However, as already outlined, this is for outdoor archery. What is even more important is that the medium transmittance in the first color range is 15% above the second color range so that a clear difference is present which brightens that center in contrast to the dark and nearly black surrounding region. The transmittance is cut off below 400 nm. From that point, the transmittance rises towards a peak roughly at 470 nm. From that peak, the transmittance drops again towards 600 nm. Between 600 nm and 690 nm, the transmittance remains low, roughly below 2%, until it rises again towards 780 nm. The transmittance may remain high in the infrared region above 780 nm or may drop again.

Such a profile may be provided by mixing, per 1 kg of Lexan OQ 4820, 0.002 g of Macrolex Yellow E2R, 0.02 g of Sandoplast Blue 2B, 0.034 g of Paliogen L6480 and 0.09 g of Heliogen K6902. Therein, kg abbreviates Kilogram and g abbreviates Gram. Such, a possible mixture may consist of 99.985402 wt % of Lexan OQ 4820, 0.0001999708 wt % of Macrolex Yellow E2R, 0.001999708 wt % of Sandoplast Blue 2B, 0.003399635 wt % of Paliogen L6480 and 0.0089986862 wt % of Heliogen K6902. Therein, wt % designates the weight percentage. After mixing the pellets as described, an extrusion process at 300° C. can be carried out, in particular with a mono screw can in order to improve the color uniformity. Subsequently, a dry process for 4 hours at 120° C. and an injection molding process in a lens or shield mold at 280 to 300° C. follows. Subsequently, the lens or shield may then be dipped in a hard coating resin followed by a polymerization process with thermal curing at 129° C. It is possible to apply a mirror coating e.g. with a vacuum process, for example according to U.S. Pat. No. 6,794,066 B2.

Figure 7:
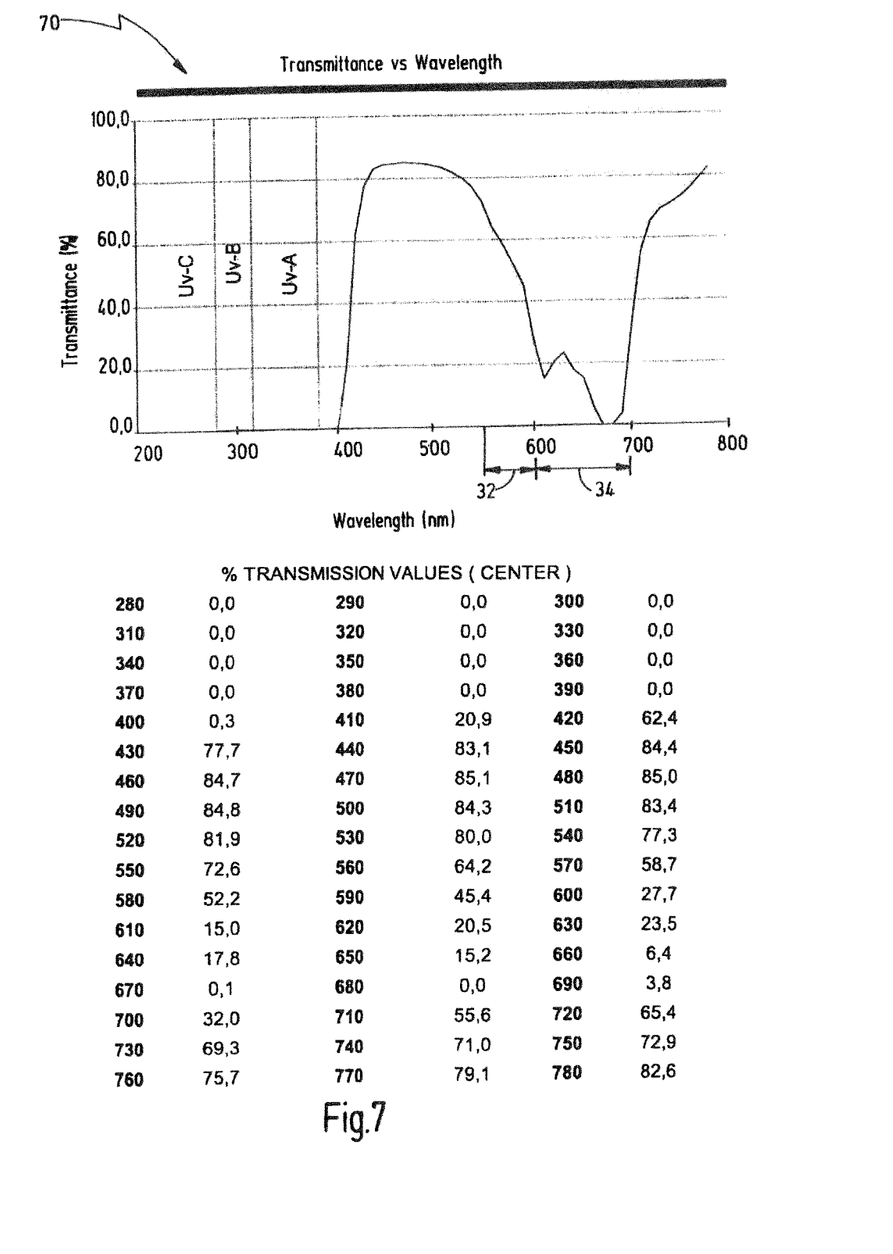
FIG. 7 shows a transmittance curve of an embodiment, in particular for indoor archery.

FIG. 7 shows a further embodiment of a lens 10 wherein transmittance graph 70 is specifically designed for indoor archery purposes. Generally, the medium transmittance over the complete spectral range 30 is higher. This is since indoor light sources usually provide for lesser light intensity than the sun. Hence, a medium transmittance within the second color range 34, which is again in the red wavelength region, is about 10%. However, again, the first medium transmittance 36 within the first color range 32 is at least 15% higher at about 45%. Hence, again, the yellow region in that center would appear brighter in a dark surrounding area. The transmittance is cut off below 400 nm. From that point, the transmittance rises towards a peak roughly at 470 nm. In general, the transmittance curve has a flattened top roughly between 440 and 530 nm in which transmittance is above 80%. From that flat top, the transmittance drops again towards 600 nm. From 600 nm to 630 nm, there is another slight increase towards a transmittance of 23%. Then, it drops again 680 nm to a transmission at about 0%. Above 680 nm, it rises again towards 780 nm. The transmittance may remain high in the infrared region above 780 nm or may drop again.

Figure 8:
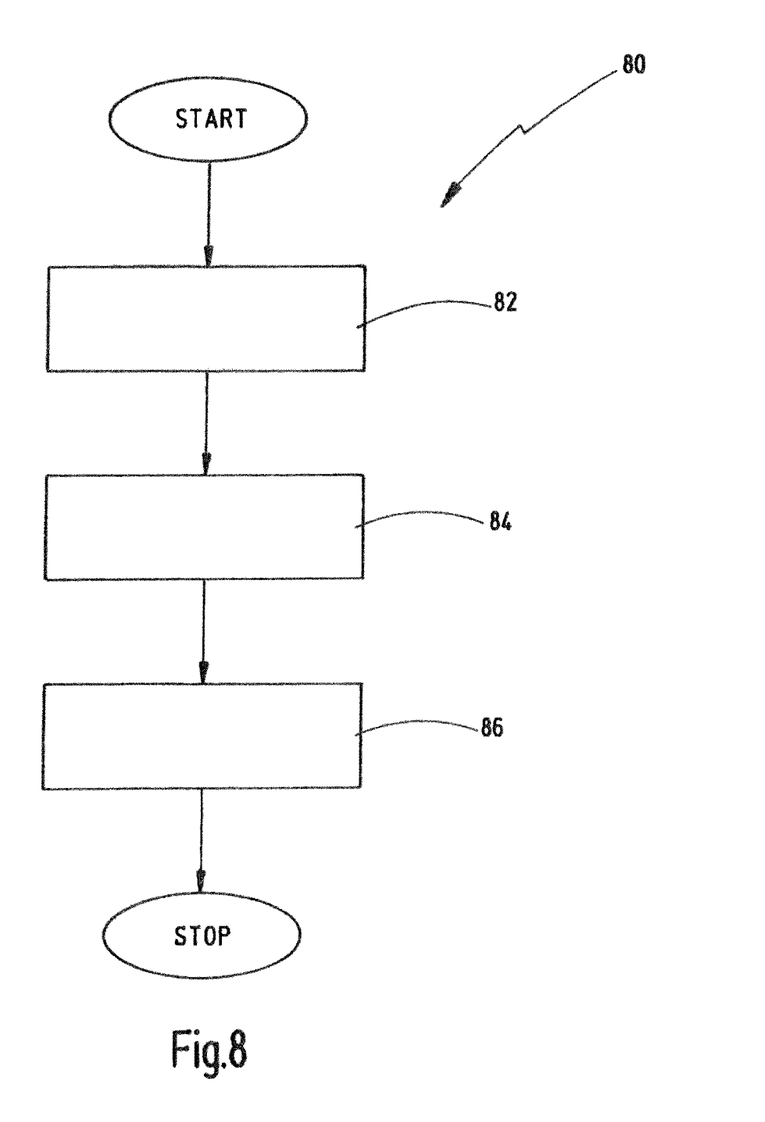
FIG. 8 shows an embodiment of a method for providing a lens for an eyewear for sports archery.

FIG. 8 shows a method 80 for providing a lens for an eyewear 20 for sports archery. After the method has started, in a first step, a color of a center of a target is determined as a first color. In the example of the target shown in FIG. 5, that would be yellow. In a further step 84, the color of a region directly encompassing the center of the target is determined as a second color, wherein the second target color is different from the first target color. In the specific example of the target in FIG. 5, that would be red.

Then, in a step 86, the lens 10 having a transmittance in a spectral range, wherein the spectral range includes a first color range and a second color range which are different from each other, is provided, wherein a first medium transmittance in the first color range is high and wherein a second medium transmittance in the second color range is low. Further, the first color range corresponds to the first target color and the second color range corresponds to the second target color. In the specific example, that would be the first color range ranging from 550 nm to 600 nm to correspond to yellow and the second color range ranging from 600 nm to at least 700 nm to encompass or correspond to red.

Of course, in case of other targets, the method could be conducted with other colors.

In particular, it may of course be the case that the lens has a transmittance in a spectral range at least between 400 and 780 nm, wherein the first color range is at least 50 nm broad, wherein the second color range is at least 50 nm broad, and wherein a medium transmittance in the spectral range is above 35%, wherein a maximum value of transmittance in the spectral range is above 70%, wherein the second medium transmittance in the second color range is below 20%, wherein a maximum value of transmittance within the second color range is below 30%, and wherein the first medium transmittance is at least 15% higher than the second medium transmittance.

Figure 9:
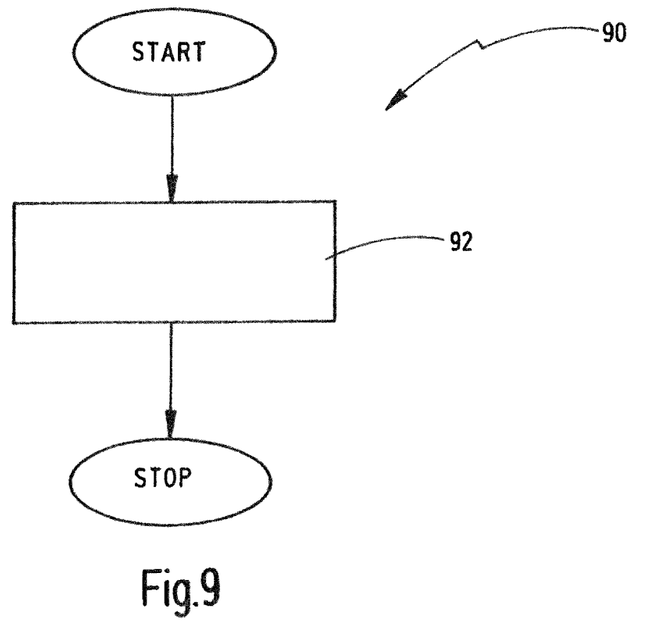
FIG. 9 shows an embodiment of a method of using a lens for enhanced visual targeting of a sports archery target; and,
FIG. 10 shows an embodiment of a method for enhanced visual targeting of a sports archery target.

Further, in FIG. 9, a method of using a lens according to the lens 10 described in connection with FIGS. 1 and 2 and 4 may be used for enhanced visual targeting of a sports archery target. Hence, in a step 92 that lens is used for enhanced targeting of a sports archery target. In particular, it is used then in an eyewear 20 by the athlete.

Figure 10:
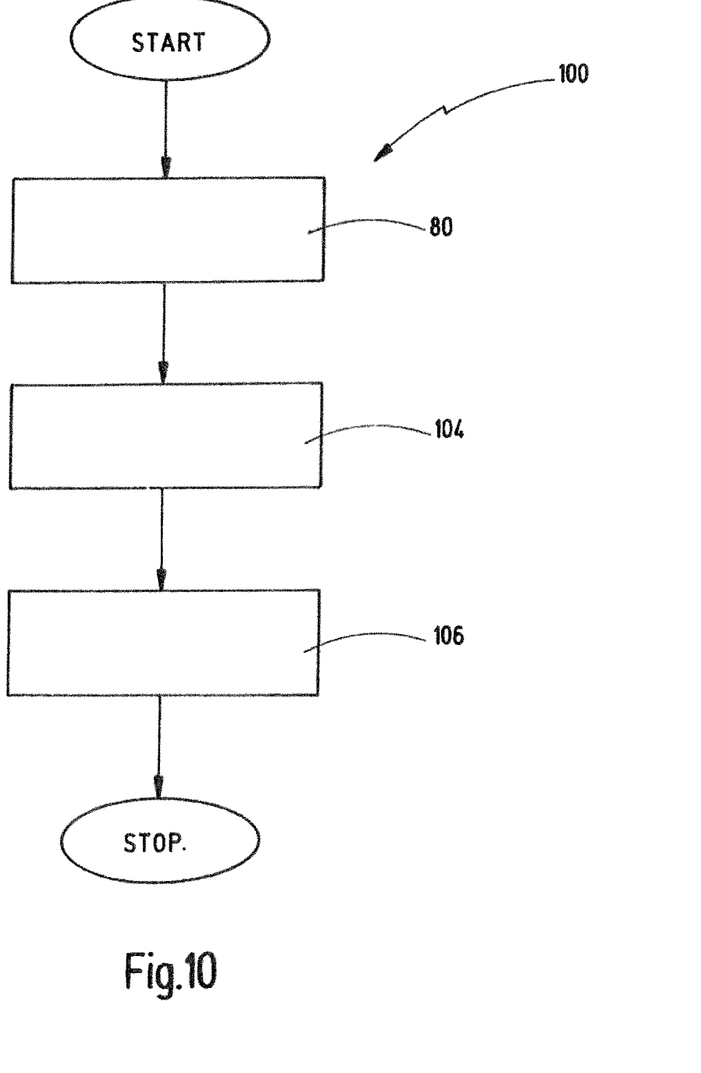

Further, in FIG. 10, there is shown a method for enhanced visual targeting of a sports archery target. The method includes the step of providing at least one lens, in particular two lenses, namely a right lens and a left lens, according to the method shown in FIG. 8.

Then, in step 104, an eyewear 20 including the at least one lens is provided.

Last, the eyewear 20 is used for targeting a sports archery target in step 106.

Further, this disclosure includes further embodiments according to the following clauses:

Clause 1. Lens for an eyewear, the lens having a transmittance in a spectral range at least between 400 and 780 nm, wherein the spectral range comprises a first color range and a second color range which are different from each other, wherein the first color range is at least 50 nm broad, wherein the second color range is at least 50 nm broad, and wherein a first medium transmittance in the first color range is higher than a second medium transmittance in the second color range wherein a medium transmittance in the spectral range is above 35%, wherein a maximum value of transmittance in the spectral range is above 70%, wherein the second medium transmittance in the second color range is below 20%, wherein a maximum value of transmittance within the second color range is below 30%, and wherein the first medium transmittance is at least 15% higher than the second medium transmittance.

Clause 2. Lens according to clause 1, wherein the first medium transmittance is at least 20% higher than the second medium transmittance, preferably at least 25% higher than the second medium transmittance, more preferably at least 35% higher than the second medium transmittance, most preferably at least 45% higher than the second medium transmittance.

Clause 3. Lens according to clause 1 or 2, wherein the first color range has a first boundary wavelength and the second color range has a second boundary wavelength, wherein the first boundary wavelength of the first color range and the second boundary wavelength of the first color range are identical.

Clause 4. Lens according to any of clauses 1 to 3, wherein the second color range is at least 100 nm broad, preferably at least 150 nm broad.

Clause 5. Lens according to any of clauses 1 to 4, wherein the second medium transmittance is below 15%, preferably below 10%, more preferably below 5%, most preferably below 2%.

Clause 6. Lens according to any of clauses 1 to 5, wherein the first medium transmittance is above 20%, preferably above 30%, more preferably above 50%, most preferably above 70%.

Clause 7. Lens according to any of clauses 1 to 6, wherein the medium transmittance in the spectral range is above 45%, preferably above 50%, more preferably above 60%, most preferably above 70%.

Clause 8. Lens according to any of clauses 1 to 7, wherein the first color range has a first medium wavelength and the second color range has a second medium wavelength, and wherein the second medium wavelength is larger than the first medium wavelength.

Clause 9. Lens according to any of clauses 1 to 8, wherein the second color range has a lowest wavelength and the first color range has a highest wavelength, wherein the lowest wavelength of the second color range and the highest wavelength of the first color range are identical.

Clause 10. Lens according to any of clauses 1 to 9, wherein the first color range and the second color range are each selected from a group consisting of a violet color range from 380 to 430 nm, a blue color range from 430 to 490 nm, a green color range from 490 to 550 nm, a yellow color range from 550 to 600 nm, an orange color range from 600 to 650 nm and a red color range from 650 to at least 700 nm, in particular from 650 to 780 nm.

Clause 11. Lens according to any of clauses 1 to 10, wherein the first color range is from 600 to 700 nm and/or the second color range is from 550 to 600 nm.

Clause 12. Lens according to any of clauses 1 to 11, wherein a substrate of the lens is made of plastic, in particular polycarbonate, a polycarbonate-based plastic or polyamide, which is tinted in order to provide for the desired transmittance.

Clause 13. Method for providing a lens for an eyewear for shooting sports, in particular for sports archery, comprising the following steps:
  Determining a color of a center of a target as a first target color;
  Determining a color of a region directly encompassing the center of the target as a second target color, wherein the second target color is different from the first target color; and
  Providing a lens having a transmittance in a spectral range, wherein the spectral range comprises a first color range and a second color range which are different from each other, wherein a first medium transmittance in the first color range is high, and wherein a second medium transmittance in the second color range is low, and wherein the first color range corresponds to the first target color, and wherein the second color range corresponds to the second target color.

Clause 14. Method according to clause 13, wherein the lens has a transmittance in a spectral range at least between 400 and 780 nm, wherein the first color range is at least 50 nm broad, wherein the second color range is at least 50 nm broad, and wherein a medium transmittance in the spectral range is above 35%, wherein a maximum value of transmittance in the spectral range is above 70%, wherein the second medium transmittance in the second color range is below 20%, wherein a maximum value of transmittance within the second color range is below 30%, and wherein the first medium transmittance is at least 15% higher than the second medium transmittance.

Clause 15. Use of a lens according to any of clauses 1 to 12 for enhancing visually targeting a sports archery target.

Clause 16. Method of using a lens according to any of clauses 1 to 12 for enhancing visually targeting a sports archery target.

Clause 17. Method for enhancing visually targeting a sports archery target, comprising the following steps:
  Providing at least one lens according to a method of step 13 or 14;
  Providing an eyewear comprising the at least one lens; and
  Using the eyewear for targeting a sports archery target.

It is understood that the foregoing description is that of the preferred embodiments of the invention and that various changes and modifications may be made thereto without departing from the spirit and scope of the invention as defined in the appended claims.

What is claimed is:

1. A lens for an eyewear, the lens comprising:
  a lens body having a transmittance in a spectral range at least between 400 and 780 nm;
  said spectral range including a first color range and a second color range;
  said first color range being different than said second color range;
  said first color range being at least 50 nm broad;
  said second color range being at least 50 nm broad;
  said first color range having a first medium transmittance;
  said second color range having a second medium transmittance and a second maximum value of transmittance;
  said first medium transmittance being higher than said second medium transmittance;
  said spectral range having a medium transmittance therein and a maximum value of transmittance therein;
  said medium transmittance in said spectral range being above 55%;
  said maximum value of transmittance in said spectral range being above 70%;
  said second medium transmittance being below 20%;
  said second maximum value of transmittance being below 30%;
  said first medium transmittance being at least 45% higher than said second medium transmittance; and,
  said first color range and the second color range being each selected from a group consisting of a violet color range from 380 to 430 nm, a blue color range from 430 to 490 nm, a green color range from 490 to 550 nm, a yellow color range from 550 to 600 nm, an orange color range from 600 to 650 nm and a red color range from 650 to at least 700 nm.

2. A lens for an eyewear, the lens comprising:
  a lens body having a transmittance in a spectral range at least between 400 and 780 nm;
  said spectral range including a first color range and a second color range;
  said first color range being different than said second color range;
  said first color range being at least 50 nm broad;
  said second color range being at least 50 nm broad;
  said first color range having a first medium transmittance;
  said second color range having a second medium transmittance and a second maximum value of transmittance;
  said first medium transmittance being higher than said second medium transmittance;
  said spectral range having a medium transmittance therein and a maximum value of transmittance therein;

said medium transmittance in said spectral range being above 35%;
said maximum value of transmittance in said spectral range being above 70%;
said second medium transmittance being below 20%;
said second maximum value of transmittance being below 30%; and,
said first medium transmittance being at least 45% higher than said second medium transmittance.

3. The lens of claim 2, wherein:
said first color range has a first boundary wavelength;
said second color range has a second boundary wavelength; and,
said first boundary wavelength of said first color range and said second boundary wavelength of said second color range are identical.

4. The lens of claim 2, wherein said medium transmittance of said spectral range is above 70%.

5. The lens of claim 2, wherein:
said first color range has a first medium wavelength;
said second color range has a second medium wavelength; and,
said second medium wavelength is larger than said first medium wavelength.

6. The lens of claim 2, wherein:
said second color range has a lowest wavelength;
said first color range has a highest wavelength; and
said lowest wavelength of said second color range and said highest wavelength of said first color range are identical.

7. The lens of claim 2, wherein said first color range and said second color range are each selected from a group consisting of a violet color range from 380 to 430 nm, a blue color range from 430 to 490 nm, a green color range from 490 to 550 nm, a yellow color range from 550 to 600 nm, an orange color range from 600 to 650 nm and a red color range from 650 to at least 700 nm.

8. The lens of claim 2, wherein said lens body includes a substrate made of one of a plastic, a polycarbonate-based plastic and polyamide, which is tinted in order to provide for the desired transmittance.

9. The lens of claim 2, wherein said lens body has a lens transmittance cut off below 380 nm.

10. A lens for an eyewear, the lens comprising:
a lens body having a transmittance in a spectral range at least between 400 and 780 nm;
said spectral range including a first color range and a second color range;
said first color range being different than said second color range;
said first color range being at least 50 nm broad;
said second color range being at least 50 nm broad;
said first color range having a first medium transmittance;
said second color range having a second medium transmittance and a second maximum value of transmittance;
said first medium transmittance being higher than said second medium transmittance;
said spectral range having a medium transmittance therein and a maximum value of transmittance therein;
said medium transmittance in said spectral range being above 35%;
said maximum value of transmittance in said spectral range being above 70%;
said second medium transmittance being below 20%;
said second maximum value of transmittance being below 30%;
said first medium transmittance being at least 15% higher than said second medium transmittance; and,
wherein said second color range is at least 150 nm broad.

11. A lens for an eyewear, the lens comprising:
a lens body having a transmittance in a spectral range at least between 400 and 780 nm;
said spectral range including a first color range and a second color range;
said first color range being different than said second color range;
said first color range being at least 50 nm broad;
said second color range being at least 50 nm broad;
said first color range having a first medium transmittance;
said second color range having a second medium transmittance and a second maximum value of transmittance;
said first medium transmittance being higher than said second medium transmittance;
said spectral range having a medium transmittance therein and a maximum value of transmittance therein;
said medium transmittance in said spectral range being above 35%;
said maximum value of transmittance in said spectral range being above 70%;
said second medium transmittance being below 20%;
said second maximum value of transmittance being below 30%;
said first medium transmittance being at least 15% higher than said second medium transmittance; and,
wherein said second medium transmittance is below 2%.

12. A lens for an eyewear, the lens comprising:
a lens body having a transmittance in a spectral range at least between 400 and 780 nm;
said spectral range including a first color range and a second color range;
said first color range being different than said second color range;
said first color range being at least 50 nm broad;
said second color range being at least 50 nm broad;
said first color range having a first medium transmittance;
said second color range having a second medium transmittance and a second maximum value of transmittance;
said first medium transmittance being higher than said second medium transmittance;
said spectral range having a medium transmittance therein and a maximum value of transmittance therein;
said medium transmittance in said spectral range being above 35%;
said maximum value of transmittance in said spectral range being above 70%;
said second medium transmittance being below 20%;
said second maximum value of transmittance being below 30%;
said first medium transmittance being at least 15% higher than said second medium transmittance; and,
wherein said first medium transmittance is above 70%.

13. A lens for an eyewear, the lens comprising:
a lens body having a transmittance in a spectral range at least between 400 and 780 nm;
said spectral range including a first color range and a second color range;
said first color range being different than said second color range;
said first color range being at least 50 nm broad;
said second color range being at least 50 nm broad;
said first color range having a first medium transmittance;

said second color range having a second medium transmittance and a second maximum value of transmittance;
said first medium transmittance being higher than said second medium transmittance;
said spectral range having a medium transmittance therein and a maximum value of transmittance therein;
said medium transmittance in said spectral range being above 35%;
said maximum value of transmittance in said spectral range being above 70%;
said second medium transmittance being below 20%;
said second maximum value of transmittance being below 30%;
said first medium transmittance being at least 15% higher than said second medium transmittance; and,
wherein at least one of said first color range lies in a range of 600 to 700 nm and said second color range lies in a range of of 550 to 600 nm.

14. A method for providing a lens for an eyewear for shooting sports, the method comprising the steps of:
determining a color of a center of a target as a first target color;
determining a color of a region directly encompassing the center of the target as a second target color, wherein the second target color is different from the first target color;
providing a lens having a transmittance in a spectral range, wherein the spectral range includes a first color range and a second color range which are different from each other, wherein a first medium transmittance corresponds to the first color range, and wherein a second medium transmittance corresponds to the second color range with said first medium transmittance being greater than said second medium transmittance, and wherein the first color range corresponds to the first target color, and wherein the second color range corresponds to the second target color; and,
wherein the lens has a transmittance in a spectral range at least between 400 and 780 nm, wherein the first color range is at least 50 nm broad, wherein the second color range is at least 50 nm broad, and wherein a medium transmittance in the spectral range is above 35%, wherein a maximum value of transmittance in the spectral range is above 70%, wherein the second medium transmittance in the second color range is below 20%, wherein a maximum value of transmittance within the second color range is below 30%, and wherein the first medium transmittance is at least 45% higher than the second medium transmittance.

15. A method of using a lens for enhanced visual targeting of a sports archery target, wherein the lens has a transmittance in a spectral range at least between 400 and 780 nm, wherein the spectral range comprises a first color range and a second color range which are different from each other, wherein the first color range is at least 50 nm broad, wherein the second color range is at least 50 nm broad, and wherein a first medium transmittance in the first color range is higher than a second medium transmittance in the second color range, wherein a medium transmittance in the spectral range is above 35%, wherein a maximum value of transmittance in the spectral range is above 70%, wherein the second medium transmittance in the second color range is below 20%, wherein a maximum value of transmittance within the second color range is below 30%, and wherein the first medium transmittance is at least 45% higher than the second medium transmittance; the method comprising the step of:
targeting a sports archery target with the lens.

16. A method for enhanced visual targeting of a sports archery target, the method comprising the steps of:
determining a color of a center of a target as a first target color;
determining a color of a region directly encompassing the center of the target as a second target color, wherein the second target color is different from the first target color;
providing at least one lens having a transmittance in a spectral range, wherein the spectral range comprises a first color range and a second color range which are different from each other, wherein a first medium transmittance corresponds to the first color range, and wherein a second medium transmittance corresponds to the second color range with said first medium transmittance being greater than said second medium transmittance, wherein the first medium transmittance is at least 45% higher than the second medium transmittance, and wherein the first color range corresponds to the first target color, and wherein the second color range corresponds to the second target color;
providing an eyewear comprising the at least one lens; and,
using the eyewear for targeting a sports archery target.

17. A method for providing a lens for an eyewear for shooting sports, the method comprising the steps of:
determining a color of a center of a target as a first target color;
determining a color of a region directly encompassing the center of the target as a second target color, wherein the second target color is different from the first target color; and
providing a lens having a transmittance in a spectral range, wherein the spectral range includes a first color range and a second color range which are different from each other, wherein a first medium transmittance corresponds to the first color range, and wherein a second medium transmittance corresponds to the second color range with said first medium transmittance being greater than said second medium transmittance, and wherein the first color range corresponds to the first target color, and wherein the second color range corresponds to the second target color;
wherein the lens has a transmittance in a spectral range at least between 400 and 780 nm, wherein the first color range is at least 50 nm broad, wherein the second color range is at least 50 nm broad, and wherein a medium transmittance in the spectral range is above 35%, wherein a maximum value of transmittance in the spectral range is above 70%, wherein the second medium transmittance in the second color range is below 20%, wherein a maximum value of transmittance within the second color range is below 30%, and wherein the first medium transmittance is at least 15% higher than the second medium transmittance,
wherein at least one of said first color range lies in a range of 600 to 700 nm and said second color range lies in a range of 550 to 600 nm.

18. A method of using a lens for enhanced visual targeting of a sports archery target, wherein the lens has a transmittance in a spectral range at least between 400 and 780 nm, wherein the spectral range comprises a first color range and a second color range which are different from each other, wherein the first color range is at least 50 nm broad, wherein the second color range is at least 50 nm broad, and wherein a first medium transmittance in the first color range is higher than a second medium transmittance in the second color range, wherein a medium transmittance in the spectral range is above 35%, wherein a maximum value of transmittance in the spectral range is above 70%, wherein the second medium transmittance in the second color range is below 20%, wherein a maximum value of transmittance within the second color range is below 30%, and wherein the first medium transmittance is at least 15% higher than the second medium transmittance, wherein at least one of said first color range lies in a range of 600 to 700 nm and said second color range lies in a range of 550 to 600 nm; the method comprising the step of:
  targeting a sports archery target with the lens.

19. A method for enhanced visual targeting of a sports archery target, the method comprising the steps of:
  determining a color of a center of a target as a first target color;
  determining a color of a region directly encompassing the center of the target as a second target color, wherein the second target color is different from the first target color;
  providing at least one lens having a transmittance in a spectral range, wherein the spectral range comprises a first color range and a second color range which are different from each other, wherein a first medium transmittance corresponds to the first color range, and wherein a second medium transmittance corresponds to the second color range with said first medium transmittance being greater than said second medium transmittance, wherein the first medium transmittance is at least 15% higher than the second medium transmittance, and wherein the first color range corresponds to the first target color, wherein the second color range corresponds to the second target color, and wherein at least one of said first color range lies in a range of 600 to 700 nm and said second color range lies in a range of 550 to 600 nm;
  providing an eyewear comprising the at least one lens; and,
  using the eyewear for targeting a sports archery target.

\* \* \* \* \*